(12) United States Patent
Alexander

(10) Patent No.: US 11,472,624 B2
(45) Date of Patent: Oct. 18, 2022

(54) PORTABLE FOOD AND BEVERAGE STORAGE AND PREPARATION DEVICES AND METHODS

(71) Applicant: Sugar Ray Alexander, Tyler, TX (US)

(72) Inventor: Sugar Ray Alexander, Tyler, TX (US)

(73) Assignee: Sugar Ray Alexander, Tyler, TX (US)

(*) Notice: Subject to any disclaimer, the term of this patent is extended or adjusted under 35 U.S.C. 154(b) by 325 days.

(21) Appl. No.: 16/719,021

(22) Filed: Dec. 18, 2019

(65) Prior Publication Data
US 2020/0189826 A1 Jun. 18, 2020

Related U.S. Application Data

(60) Provisional application No. 62/781,543, filed on Dec. 18, 2018.

(51) Int. Cl.
| | |
|---|---|
| *B65D 81/18* | (2006.01) |
| *F25D 11/00* | (2006.01) |
| *F25D 29/00* | (2006.01) |
| *F25B 21/02* | (2006.01) |
| *A47J 36/24* | (2006.01) |

(52) U.S. Cl.
CPC .......... *B65D 81/18* (2013.01); *A47J 36/2483* (2013.01); *F25B 21/02* (2013.01); *F25D 11/003* (2013.01); *F25D 29/00* (2013.01); *F25D 2400/02* (2013.01); *F25D 2400/12* (2013.01); *F25D 2400/361* (2013.01); *F25D 2700/12* (2013.01)

(58) Field of Classification Search
CPC ...... B65D 81/18; A47J 36/2483; F25B 21/02; F25D 11/003; F25D 29/00; F25D 2400/02; F25D 2400/12; F25D 2400/361; F25D 2700/12

USPC ............. 220/592.01, 592.03, 592.22, 592.02
See application file for complete search history.

(56) References Cited

U.S. PATENT DOCUMENTS

| | | | | |
|---|---|---|---|---|
| 4,726,193 A | * | 2/1988 | Burke | F25B 21/02 62/449 |
| 4,823,554 A | * | 4/1989 | Trachtenberg | A47J 36/26 62/3.61 |
| 5,483,799 A | * | 1/1996 | Daito | F25B 21/04 62/3.6 |
| 5,987,891 A | * | 11/1999 | Kim | H01L 35/00 62/3.6 |
| 6,658,857 B1 | * | 12/2003 | George | F25D 23/066 165/122 |
| 7,913,511 B2 | * | 3/2011 | Meyer | F25D 23/063 62/371 |

(Continued)

*Primary Examiner* — Justin M Jonaitis
(74) *Attorney, Agent, or Firm* — Eversheds Sutherland (US) LLP

(57) ABSTRACT

Devices, systems, and methods are provided for heating and cooling substances, such as food and beverages. A portable device may have an exterior surface and an interior surface, with one or more heating elements positioned at least partially between the exterior surface and the interior surface, and with one or more cooling elements positioned at least partially between the exterior surface and the interior surface. The portable device may include one or more power sources operatively connected to the one or more heating elements and the one or more cooling element, and may include at least one processor that controls, based on the one or more power sources, activation of one of the one or more heating elements or the one or more cooling elements at a time.

20 Claims, 13 Drawing Sheets

(56) References Cited

U.S. PATENT DOCUMENTS

| | | | | |
|---|---|---|---|---|
| 8,061,149 B1* | 11/2011 | Gowans | ............... | A61J 1/165 |
| | | | | 62/3.62 |
| 8,539,790 B1* | 9/2013 | Budd | ............... | A01N 1/0252 |
| | | | | 62/457.9 |
| 10,143,763 B2* | 12/2018 | Campalans | ............. | A61L 2/202 |
| 10,989,466 B2* | 4/2021 | Alexander | ............. | F25B 21/02 |
| 11,162,716 B2* | 11/2021 | Alexander | ........... | A01N 1/0252 |
| 2002/0184906 A1* | 12/2002 | Faries, Jr. | ............... | A61J 1/165 |
| | | | | 62/229 |
| 2008/0047948 A1* | 2/2008 | Rosenbloom | .......... | A47J 36/26 |
| | | | | 219/386 |
| 2017/0259956 A1* | 9/2017 | Hori | ....................... | F25B 21/04 |

* cited by examiner

PORTABLE FOOD AND BEVERAGE STORAGE AND PREPARATION DEVICES AND METHODS

CROSS-REFERENCE TO RELATED APPLICATIONS

This application claims the benefit of U.S. Provisional Application No. 62/781,543, filed Dec. 18, 2018, the disclosure of which is incorporated by reference as if set forth in full.

TECHNICAL FIELD

This disclosure relates to methods, systems, and devices for heating and cooling food and beverages.

BACKGROUND

People are increasingly busy and do not have enough time to prepare meals. Portable food and beverage storage allow people to transport food and beverage, but often do not keep food and beverage fresh, hot, cold, and/or free of bacteria over time. Coolers, for example, may maintain a cold temperature for temporary food and beverage storage, but the cooler temperatures are difficult to control and maintain. When a person is ready to heat food or liquid in a cooler, the person may need a separate device such as a microwave. Therefore, portable food and beverage storage may be improved.

Figure 1:
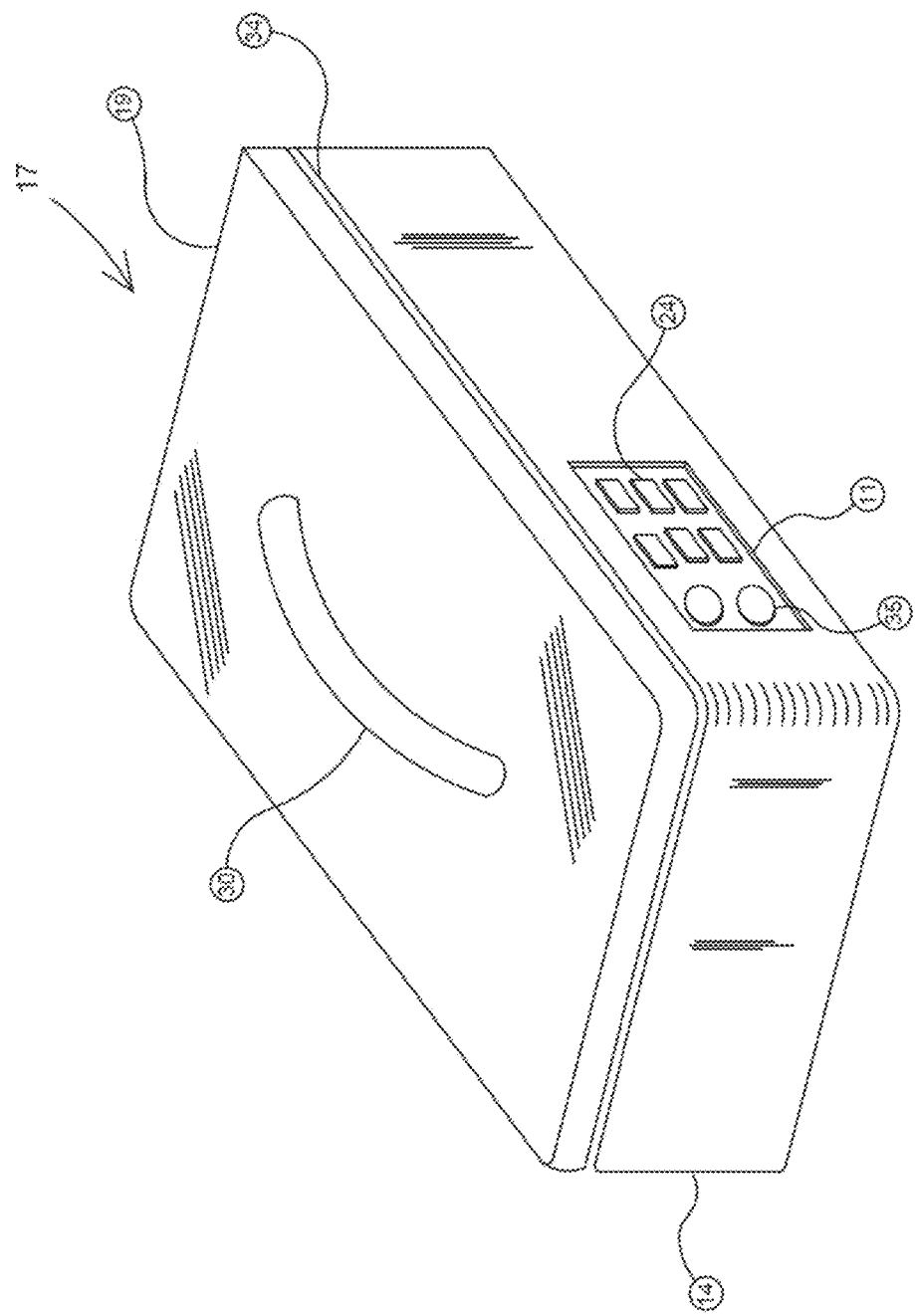
FIG. 1 illustrates a perspective view of a portable heating and cooling device, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for using portable food devices and methods for food storage and preparation.

Some portable food and beverage storage devices may allow a user to maintain a temperature of food and beverage transported within the storage devices. For example, coolers may maintain cold temperatures for food and beverage. However, a person may need to add ice or other cooling mechanisms (e.g., cold packs) to the cooler to keep the temperature cold over time, and may not be able to maintain the desired temperature of the food or beverage in the cooler. When a person is ready to prepare a meal, such as by heating cold food or beverage in a cooler, the person may remove the food or beverage from the cooler and use a separate heating device, such as a microwave, hot plate, or flame.

Therefore, people may benefit from having a single device that can both heat and cool food and beverages, and that can automatically activate heating or cooling processes based on a desired temperature of food or beverage.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates a perspective view of a portable heating and cooling device 17, in accordance with one or more example embodiments of the present disclosure.

Referring to FIG. 1, the portable heating and cooling device 17 may be a portable, cordless, battery powered device that cools and heats food, beverage, and other substances. The portable heating and cooling device 17 may include an interface display panel 24 (e.g., control panel) to operate the device (e.g., as further explained herein). The portable heating and cooling device 17 may include a handle 30 by which the microwave pal may be carried. The interface display panel 24 of the portable heating and cooling device 17 may include one or more buttons (e.g., selectable buttons, nobs, touch screen icons, etc.) for setting operation parameters (e.g., time, temperature, heating and cooling modes, etc.) for controlling operation, as well as a control pad 11 for displaying information to a user, such information about cooling time or heating time programs. In FIG. 1, a lid 19 of the portable heating and cooling device 17 is closed and sealed completely around the perimeter by a seal 34 so that any food or other contents stored in the cavity may be protected and temperature-controlled. FIG. 1 shows the handle 30 operatively connected to the lid 19, which may operate as a hinged door that may open (e.g., via a push-button release 35). The push-button release 35 may be any kind of button or latch that allows the lid 19 to release and open, and to latch and close.

Still referring to FIG. 1, the portable heating and cooling device 17 may include a control pad 11 (e.g., a key pad), as further described below with regard to FIG. 11. The control pad 11 may include an alphanumeric input device, such as alphanumeric device 1112 of FIG. 11 (e.g., a keyboard), which may be a touch screen display. The control pad 11 may receive user inputs including desired temperatures for the portable heating and cooling device 17, timers for heating or cooling food or beverage with the portable heating and cooling device 17, and the like.

In one or more embodiments, the control pad 11 may function as a user interface to operate with input/output control circuitry, allowing a user to select cooling or heating modes that cause the portable heating and cooling device 17 to cool or heat the content. The one or more buttons of the interface display panel 24 may include a start time entry, a start clock set, a cancel input, a clear input, an oven start and oven stop, and other controls.

Figure 2A:
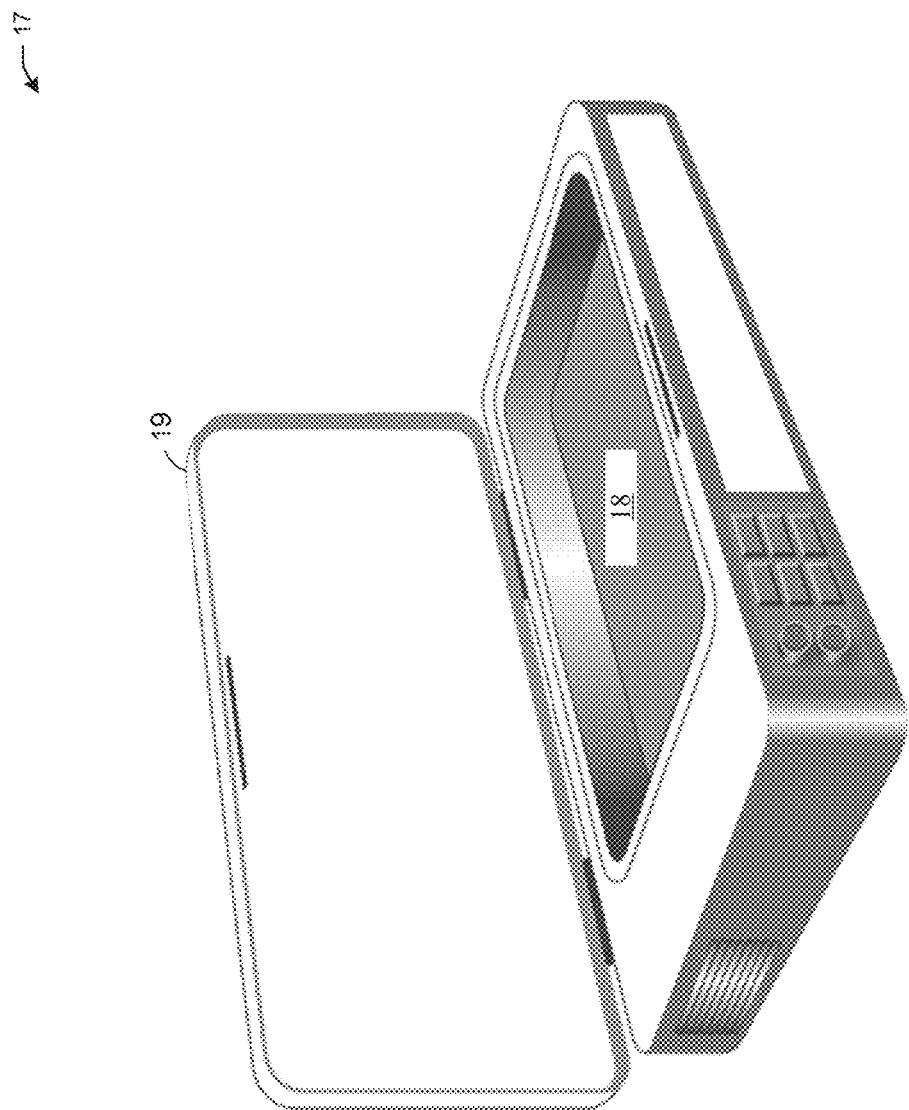
FIG. 2A illustrates a perspective view of the portable heating and cooling device of FIG. 1, in accordance with one or more example embodiments of the present disclosure.

FIG. 2A illustrates a perspective view of the portable heating and cooling device 17 of FIG. 1, in accordance with one or more example embodiments of the present disclosure.

Referring to FIG. 2A, the lid 19 is shown as open, revealing an inner cavity 18 (e.g., an interior surface of the portable heating and cooling device 17) of rectangular or another shape, and having a length, width, and depth. The inner cavity 18 may store food and beverage, heat food and beverage, and cool food and beverage as described further herein. The inner cavity 18 is not limited to the rectangular shape shown. For example, the inner cavity 18 may have a circular or semi-circular cross-section.

Figure 2B:
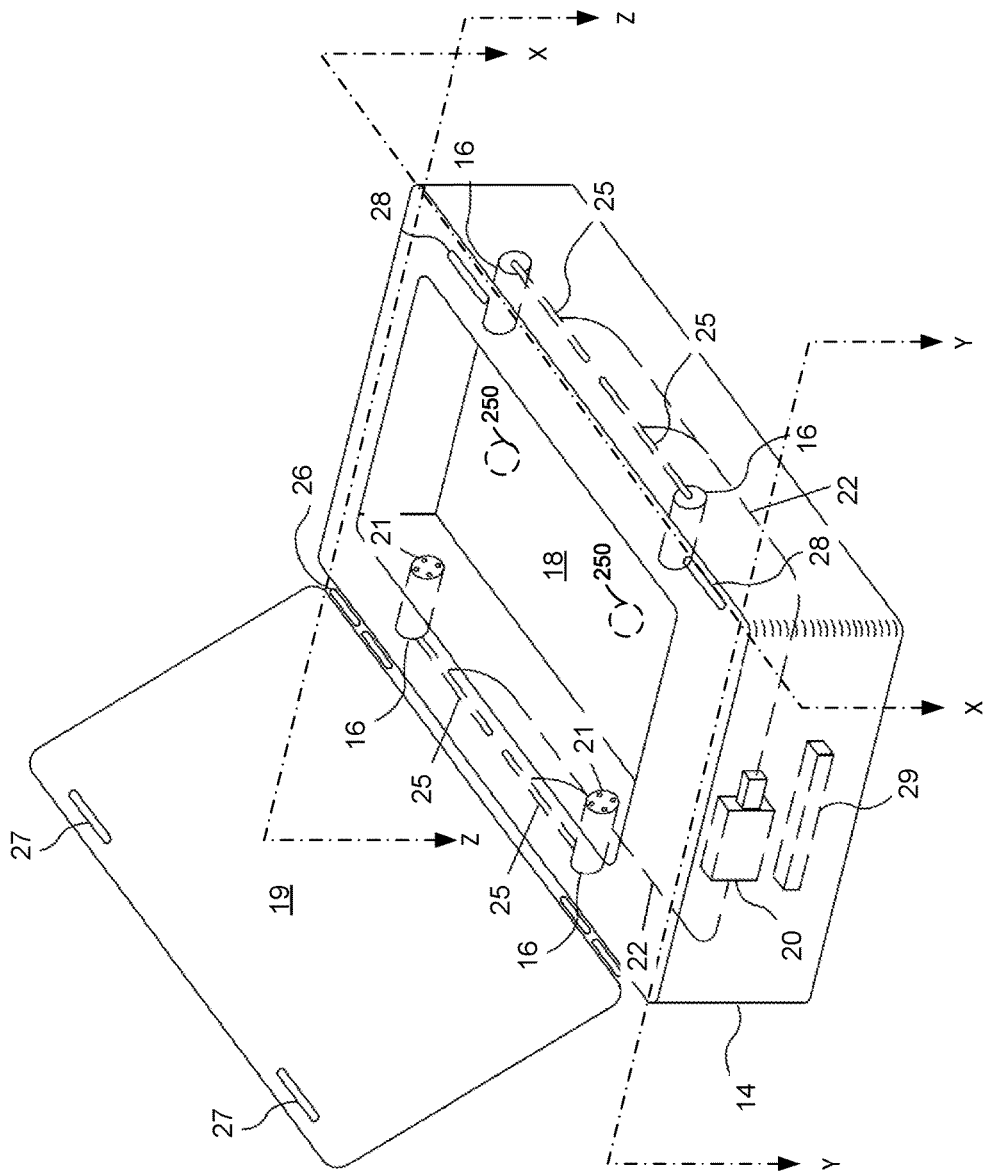
FIG. 2B illustrates a perspective view of the portable heating and cooling device of FIG. 1, in accordance with one or more example embodiments of the present disclosure.

FIG. 2B illustrates a perspective view of the portable heating and cooling device 17 of FIG. 1, in accordance with one or more example embodiments of the present disclosure.

Referring to FIG. 2B, the portable heating and cooling device 17 may include a power source 20 which may use a variety of nominal output powers. The portable heating and cooling device 17 may include a housing 14 (e.g., an exterior surface). In between the housing 14 and the inner cavity 18, the portable heating and cooling device 17 may include one or more feeding structures (e.g., a feeding ports 21) for guiding microwaves generated by one or more radio frequency (RF) transistors 25 to the inner cavity 18. The feeding ports 21 may be arranged at or within any walls of the inner cavity 18.

In one or more embodiments, the one or more RF transistors 25 may include solid state RF power transistors, which may be of microwave type and may generate radio waves that may be guided into the inner cavity 18 by the feeding ports 21. The one or more RF transistors 25 may produce a power output of greater than 400 watts with a wave frequency of approximately 2,450 megahertz (2.45 gigahertz), for example. The housing 14 may provide the feeding port 21 for transporting the RF solid state heating energy generated by the one or more RF transistors 25. The one or more RF transistor 25 may be powered by rechargeable battery 29 (e.g., a lithium-ion battery or another type of battery) disposed within the housing (e.g., between the housing 14 and the inner cavity 18). The rechargeable battery 29 may be capable of operating the one or more RF transistors 25 for a period of time (e.g., at least 8 minutes) by providing power to the one or more RF transistors 25. The RF energy generated by the one or more RF transistors 25 may be guided by the waveguide 16 between the housing 14 and the inner cavity 18, and through the feeding port 21 into the inner cavity 18 to provide heat to the inner cavity 18.

In one or more embodiments, the one or more RF transistors 25 may include Gallium Nitride transistors, laterally diffused metal oxide (LDMOS) transistors, or other types of transistors.

FIG. 2B shows a male clamp 27 and a female clamp 28 to secure the seal door (the male and female clamps may be in opposite locations than the ones shown in FIG. 2B). A multi-element closure of the top side of lid 19 may connected to the housing 14 by way of hinge 26 or another mechanism that allows for the rotatable opening and closing of the lid 19.

Still referring to FIG. 2B, the power source 20 provide power to one or more transmission lines 22 (e.g., power lines, wires, etc.) that may operatively connect to the one or more RF transistors 25. The rechargeable battery 29 may provide power to the power source 20, which may control the power output to the one or more transmission lines 22.

In one or more embodiments, the portable heating and cooling device 17 may include sensors 250, which may include temperature sensors, microwave sensors, or other types of sensors. The sensors 250 may be disposed anywhere within the portable heating and cooling device 17, such as within the inner cavity 18, and may be capable of determining the temperature within of the inner cavity 18.

Figure 3:
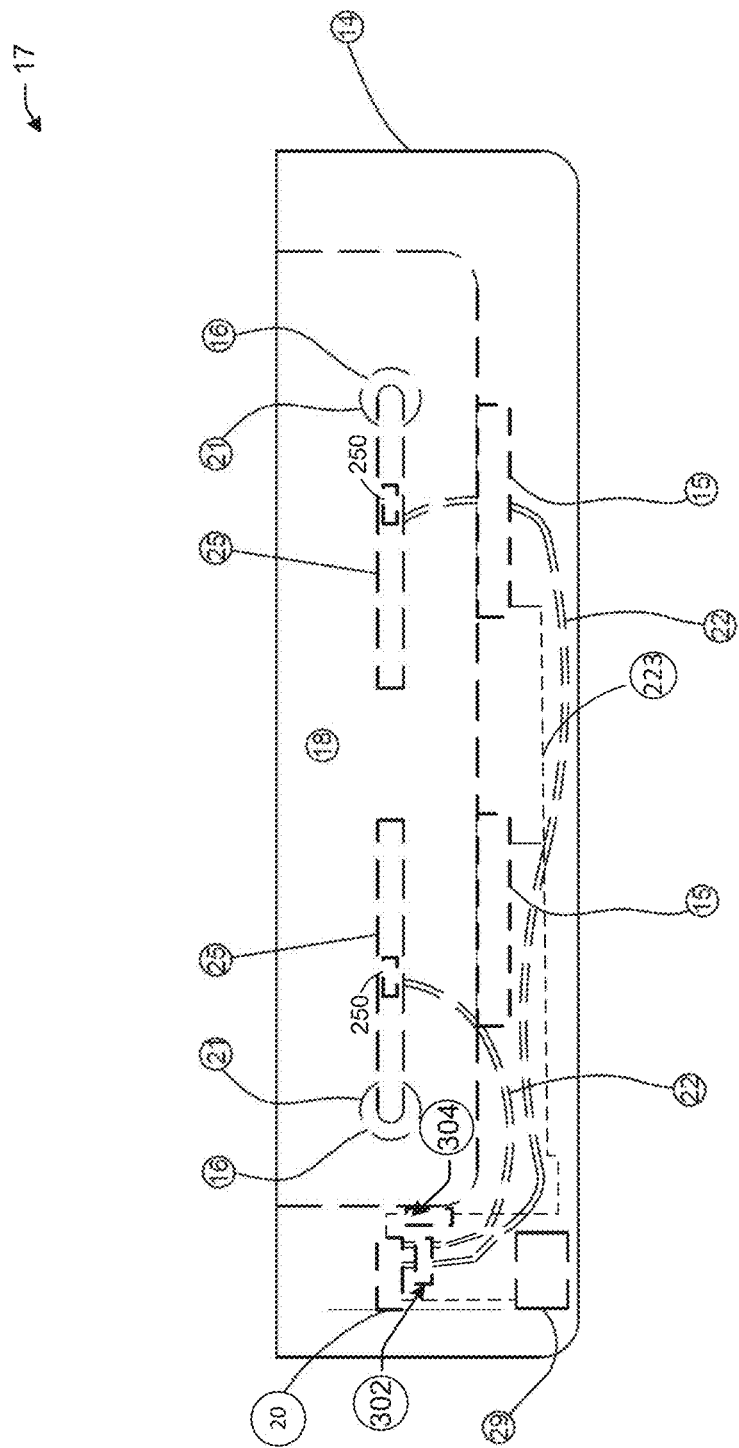
FIG. 3 illustrates a cross-sectional side view of the portable heating and cooling device of FIG. 1, in accordance with one or more example embodiments of the present disclosure.

FIG. 3 illustrates a cross-sectional side view of the portable heating and cooling device 17 of FIG. 1, in accordance with one or more example embodiments of the present disclosure. The cross-sectional side view of the portable heating and cooling device 17 may be based on the cross-section of line X from FIG. 2B.

Referring to FIG. 3 the portable heating and cooling device 17 may include one or more contacts 15 (e.g., Peltier contacts or other types of contacts) at the bottom of the inner cavity 18 or elsewhere within the inner cavity 18. The one or more contacts 15 may receive power from the power source 20, and may convert the power to heating or cooling to keep/render the food and/or content hot or cold.

Still referring to FIG. 3, the portable heating and cooling device 17 may include a measuring unit or the like (not shown), capable of measuring a signal reflected from the inner cavity 18 as a function of operating frequency. Microwaves transmitted into the inner cavity 18 may be absorbed by the load (e.g., if present in the inner cavity 18), absorbed by elements in the inner cavity 18, or other objects present in the inner cavity 18, or reflected back from the inner cavity 18 (or the one or more feeding ports 21). In addition to controlling the frequency of the generated microwave, advantages of the portable heating and cooling device 17 may also include controlling the output power level and an inherent narrow-band feature. The microwave portable heating and cooling device 17 may include sources having mid-band frequencies, and other semiconductors may also be adapted to for performance as well.

In one or more embodiments, the power source 20 may provide power to the one or more contacts 15 and to the one or more RF transistors 25 (e.g., by receiving current from the removable battery 29 or another source of power, such as a power receptacle). The one or more contacts 15 and to the one or more RF transistors 25 may be operatively connected to the power source 20 by one or more power lines, such as the transmission line 22 and/or a transmission line 223, which may be one transmission line or multiple transmission lines. The one or more RF transistors 25 may operatively connect to the power source 20 via one or more switches 302. The one or more contacts 15 may operatively connect to the power source 20 via one or more switches 304. The one or more switches 302 and the one or more switches 304 may be one switch or multiple switches, and may operate separately or in conjunction with one another. For example, when a user input received by the portable heating and cooling device 17 indicates that food or beverage is to be cooled, the one or more switches 304 may close to allow power from the power source 20 to be provided to the one or more contacts 15 via the transmission line 223. When a user input received by the portable heating and cooling device 17 indicates that food or beverage is to be heated, the one or more switches 302 may close to allow power from the power source 20 to be provided to the one or more RF transistors 25 via the transmission line 22. When the one or more switches 302 are closed, the one or more switches 304 may be open, and vice versa, to ensure that the portable heating and cooling device 17 provides power to the one or more RF transistors 25 (e.g., for heating) or to the one or more contacts 15 (e.g., for cooling). In this manner, the portable heating and cooling device 17 may be in a heating mode/state or a cooling mode/state at a given time. The one or more switches 302 and the one or more switches 304 may include analog and/or digital switches.

In one or more embodiments, the sensors 250 may detect temperature data that the portable heating and cooling device 17 may use to determine whether to provide power to (e.g., activate) the one or more RF transistors 25 or the one or more contacts 15 (e.g., whether to heat or cool the inner cavity 18 of the portable heating and cooling device 17).

In one or more embodiments, the one or more contacts 15 may provide a cooled junction. When a contact of the one or more contacts 15 receives current from the power source 20, a first side of the contact may transfer heat to a second side of the contact, resulting in the cooling of the first side, which may cause the portable heating and cooling device 17 to decrease in temperature. The first side may be more proximal to the inner cavity 18 than the second side to cause cooling.

Figure 4:
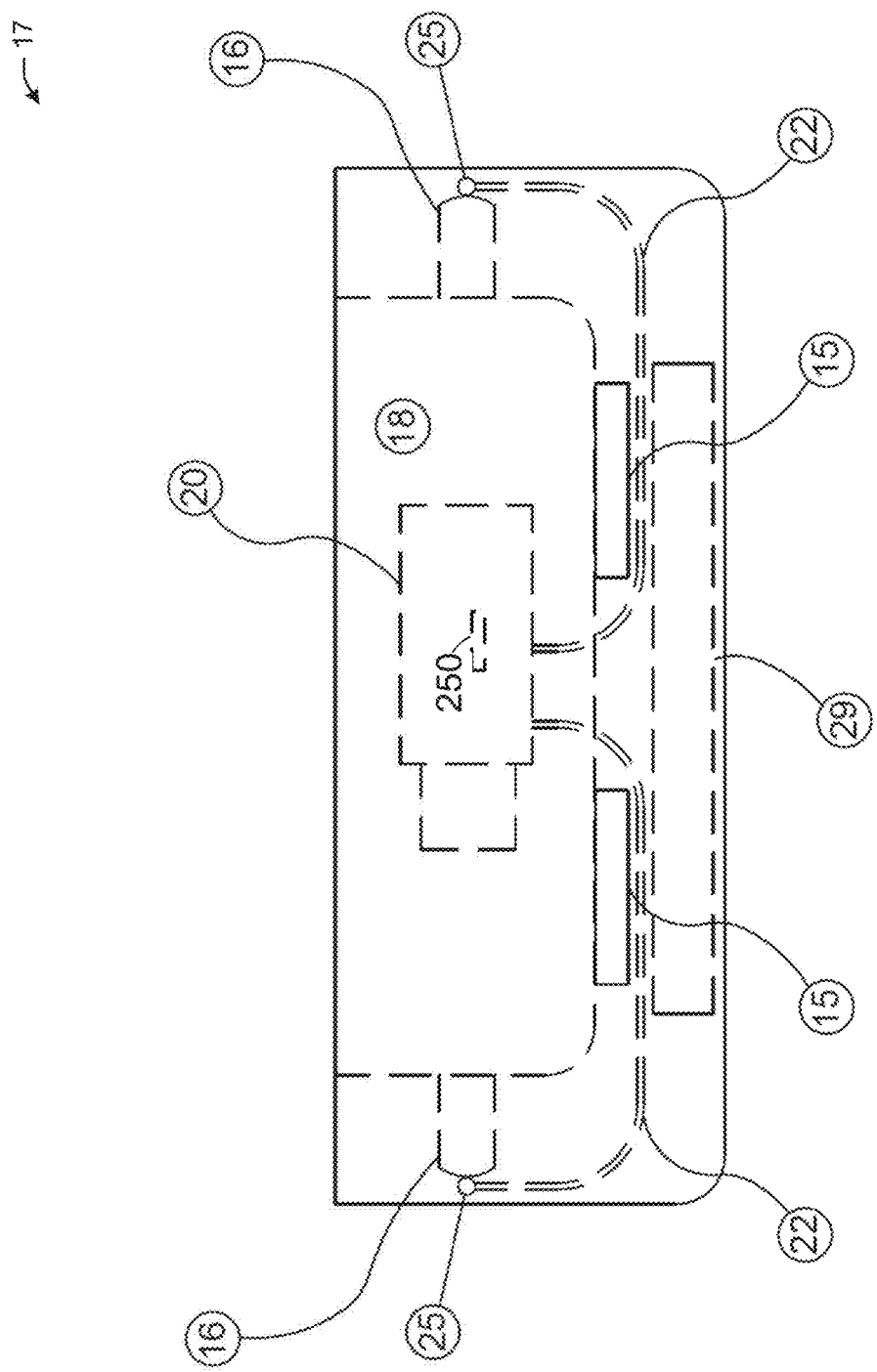
FIG. 4 illustrates a cross-sectional side view of the portable heating and cooling device of FIG. 1, in accordance with one or more example embodiments of the present disclosure.

FIG. 4 illustrates a cross-sectional side view of the portable heating and cooling device 17 of FIG. 1, in accordance with one or more example embodiments of the present disclosure. The cross-sectional side view of the portable heating and cooling device 17 may be based on the cross-section of line Y from FIG. 2B.

Referring to FIG. 4, the waveguide 16 may receive controlled RF energy (e.g., microwaves) from the one or more RF transistors 25, and may delivery the controlled RF energy to the inner cavity 18 of the portable heating and cooling device 17 at one or more frequencies (e.g., two thousand four hundred and fifty megahertz (2,450 MHz)). FIG. 4 shows a side view of the housing 14 provided for alternating current (AC) power from a source by way of adapter for direct current, such as rechargeable battery 29 or a vehicle power source appropriate for such use, for example. The lid 19 is removed in FIG. 4 for clarity.

Figure 5:
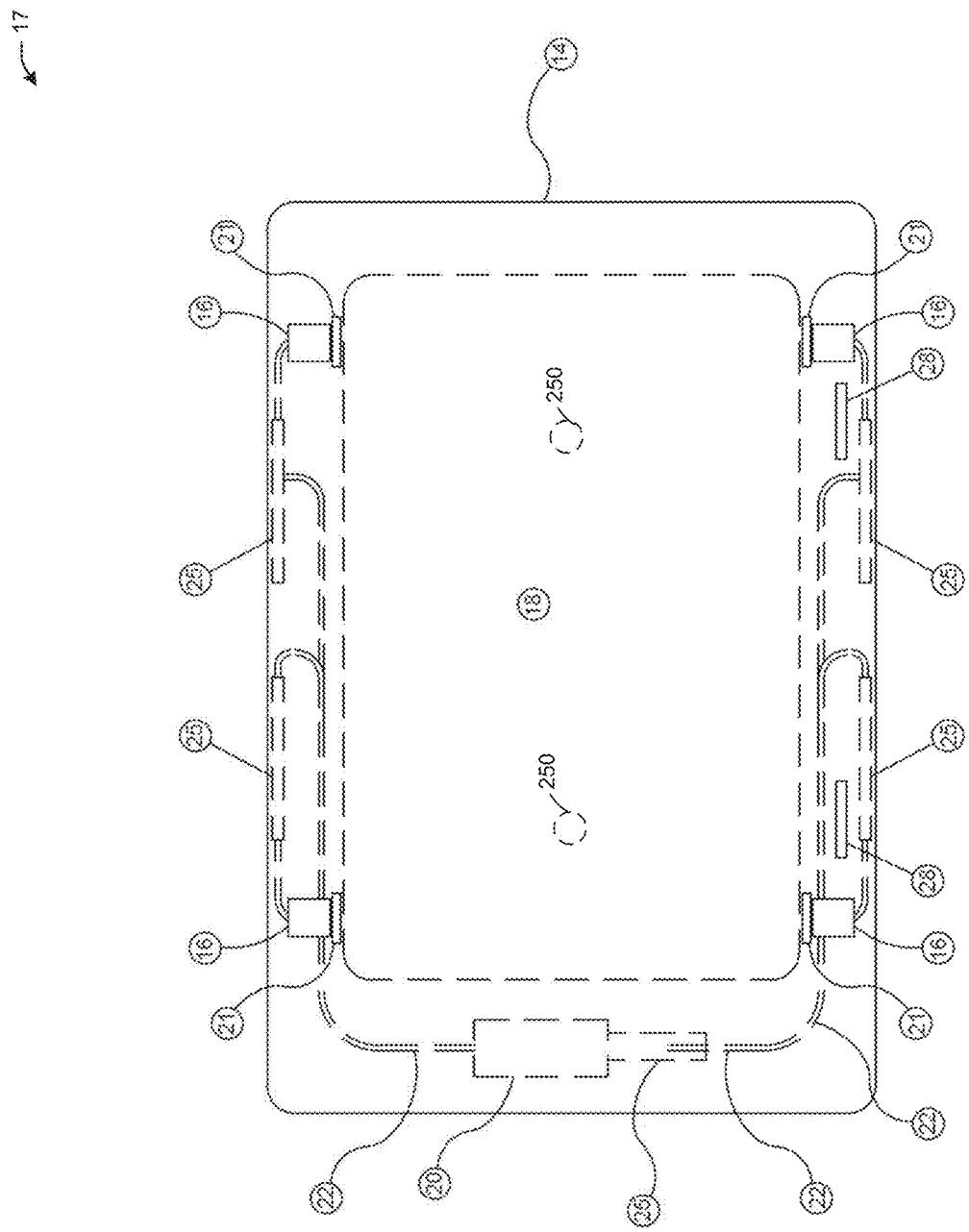
FIG. 5 illustrates a top view of the portable heating and cooling device of FIG. 1, in accordance with one or more example embodiments of the present disclosure.

FIG. 5 illustrates a top view of the portable heating and cooling device 17 of FIG. 1, in accordance with one or more example embodiments of the present disclosure.

Referring to FIG. 5, the portable heating and cooling device 17 may measure microwave energy reflected from the inner cavity 18 (e.g., using the sensors 250). For example, the portable heating and cooling device 17 may measure power that is reflected from a feeding port 21. Any of the sensors 250 may be arranged inside the inner cavity 18 for measuring the microwave field produced in the cavity during operation. The measurements obtained by the portable heating and cooling device 17 may then be sent to a control unit (e.g., the control pad 11 of FIG. 1), which may use the results of the measurements in order to control the operation of the one or more RF transistors 25 and or the one or more contacts 15 (e.g., as explained further below with regard to FIG. 11 and FIG. 12).

Figure 6:
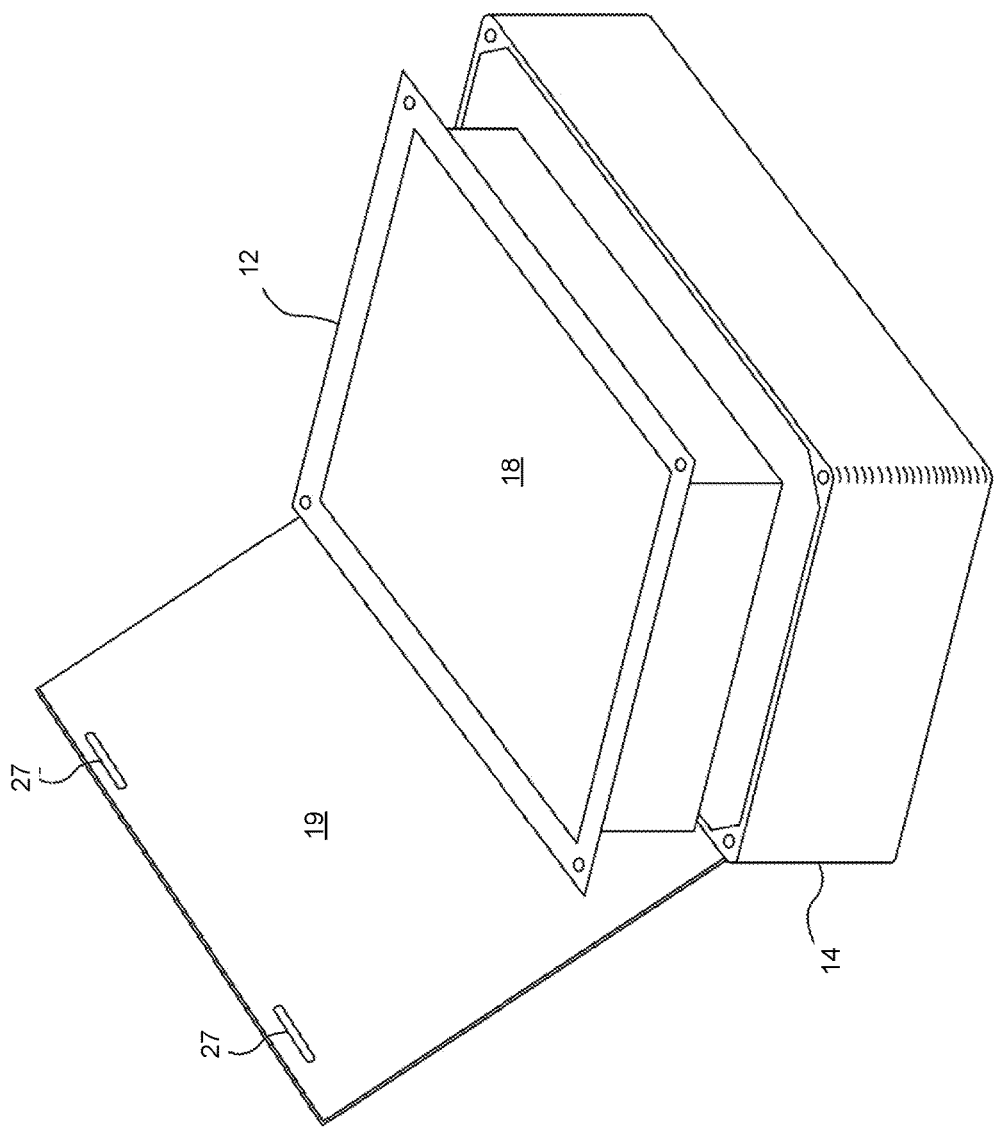
FIG. 6 illustrates a perspective view of the portable heating and cooling device of FIG. 1, in accordance with one or more example embodiments of the present disclosure.

FIG. 6 illustrates a perspective view of the portable heating and cooling device 17 of FIG. 1, in accordance with one or more example embodiments of the present disclosure.

Referring to FIG. 6, the portable heating and cooling device 17 may include an inner casing 12 separate and removable from the housing 14. The inner cavity 18 may be formed by the inner casing 12, which may fit within the housing 14. Some components of the portable heating and cooling device 17 may be positioned at least partially in between the housing 14 and the inner casing 12 (e.g., as shown in FIG. 2B a FIG. 5). FIG. 6 shows the male clamp 27 and the female clamp 28 used to secure the lid 19.

Figure 7:
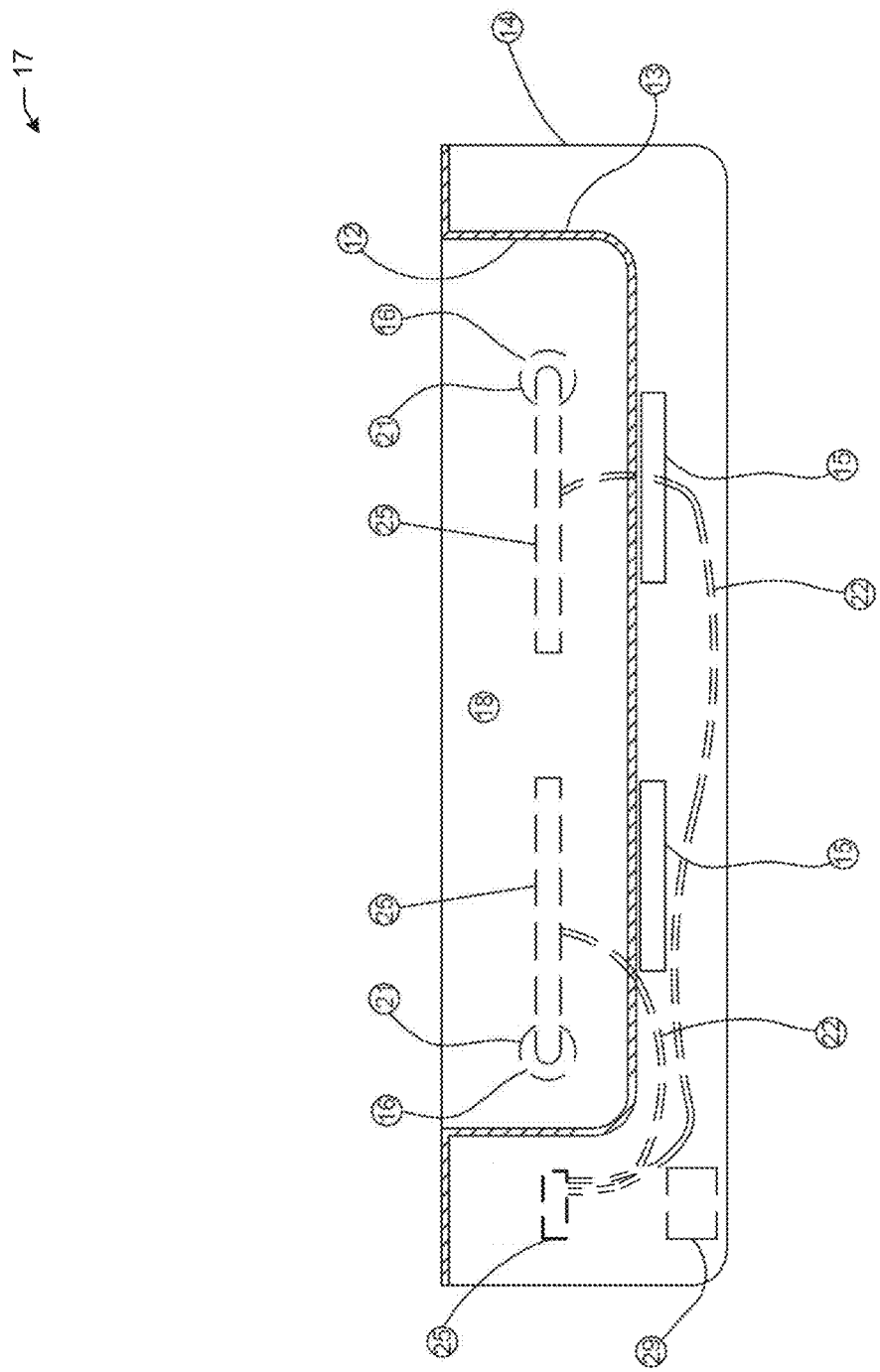
FIG. 7 illustrates a cross-sectional side view of the portable heating and cooling device of FIG. 1, in accordance with one or more example embodiments of the present disclosure.

FIG. 7 illustrates a cross-sectional side view of the portable heating and cooling device 17 of FIG. 1, in accordance with one or more example embodiments of the present disclosure. The cross-sectional side view of the portable heating and cooling device 17 may be based on the cross-section of line Z from FIG. 2B. FIG. 7 includes the inner casing 12 of FIG. 6.

Referring to FIG. 7, the inner casing 12 may be a removable plastic (or other material) container that may form the inner cavity 18 where food, beverage, and/or temperature sensitive materials may be placed and kept cold for a period of time (e.g., the inner cavity 18 may be a cavity within the inner casing 12). The food, beverage, and/or temperature sensitive materials may be placed in the inner casing 12. The portable heating and cooling device 17 may include insulation 13 inside of the housing 14 with the ability to keep the food, beverage, and/or temperature sensitive materials cold or heated for periods of time (e.g., the insulation 13 may maintain a temperature inside of the portable heating and cooling device 17.

Figure 8:
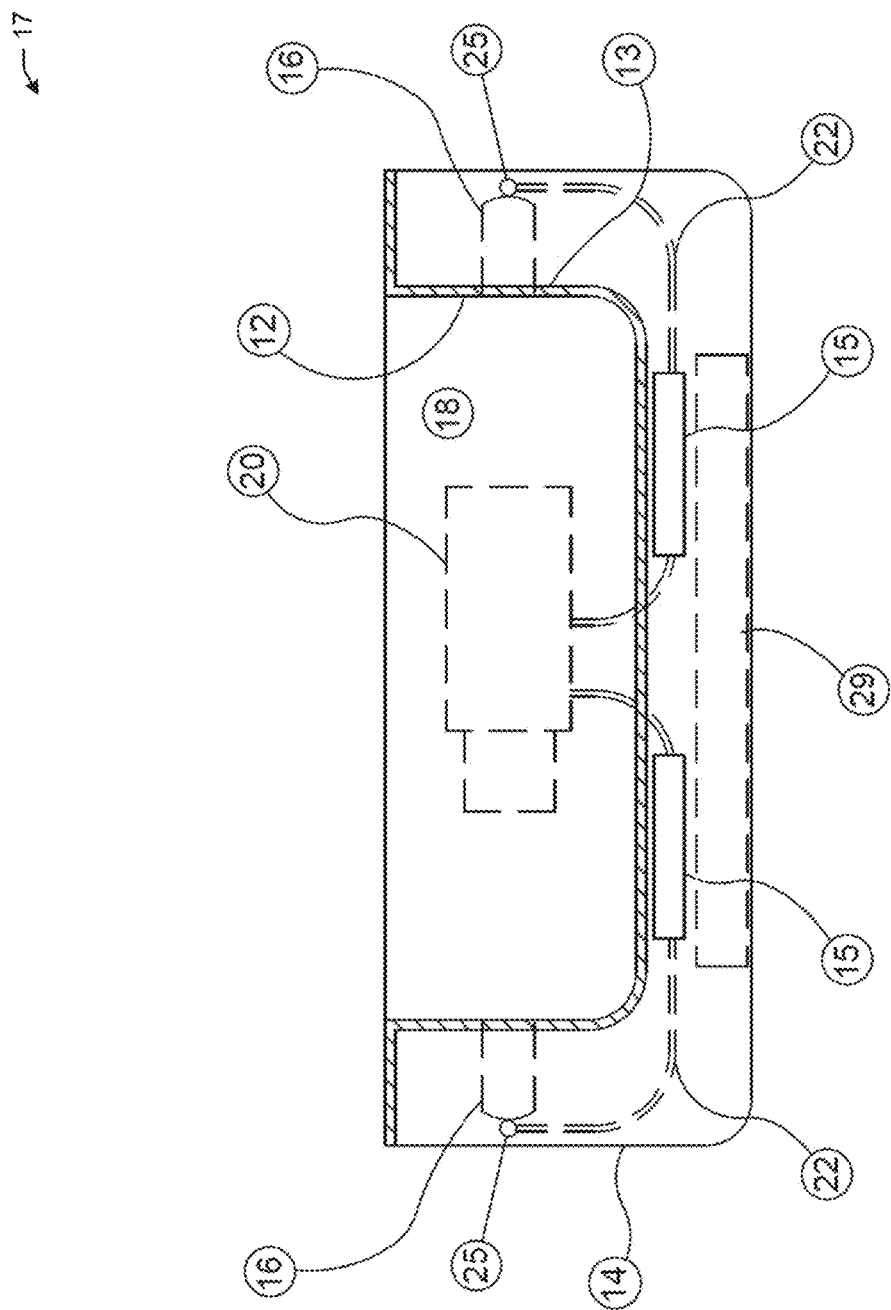
FIG. 8 illustrates a cross-sectional side view of the portable heating and cooling device of FIG. 1, in accordance with one or more example embodiments of the present disclosure.

FIG. 8 illustrates a cross-sectional side view of the portable heating and cooling device 17 of FIG. 1, in accordance with one or more example embodiments of the present disclosure.

Referring to FIG. 8, the one or more contacts 15 may be positioned at the bottom of or below the inner cavity 18 (e.g., below or within the insulation 13), and in contact with inner casing 12 to cool the inner cavity 18. For example, the inner surface of the inner cavity 18 may represent the inner casing 12. The one or more contacts 15 may be in contact with or within close proximity to (e.g., within ten millimeters of) the inner casing 12 to cause the inner casing 12 to be cold when the one or more contacts 15 are active.

FIG. 8 illustrates a cross-sectional side view of the portable heating and cooling device 17 of FIG. 1, in accordance with one or more example embodiments of the present disclosure. The cross-sectional side view of the portable heating and cooling device 17 may be based on the cross-section of line Y from FIG. 2B. FIG. 8 therefore shows FIG. 4 with the insulation 13 and the inner casing 12. FIG. 8 also shows example locations of the one or more RF transistors 25, the waveguide 16, the transmission line 22, the one or more contacts 15, and the power source 20.

Figure 9:
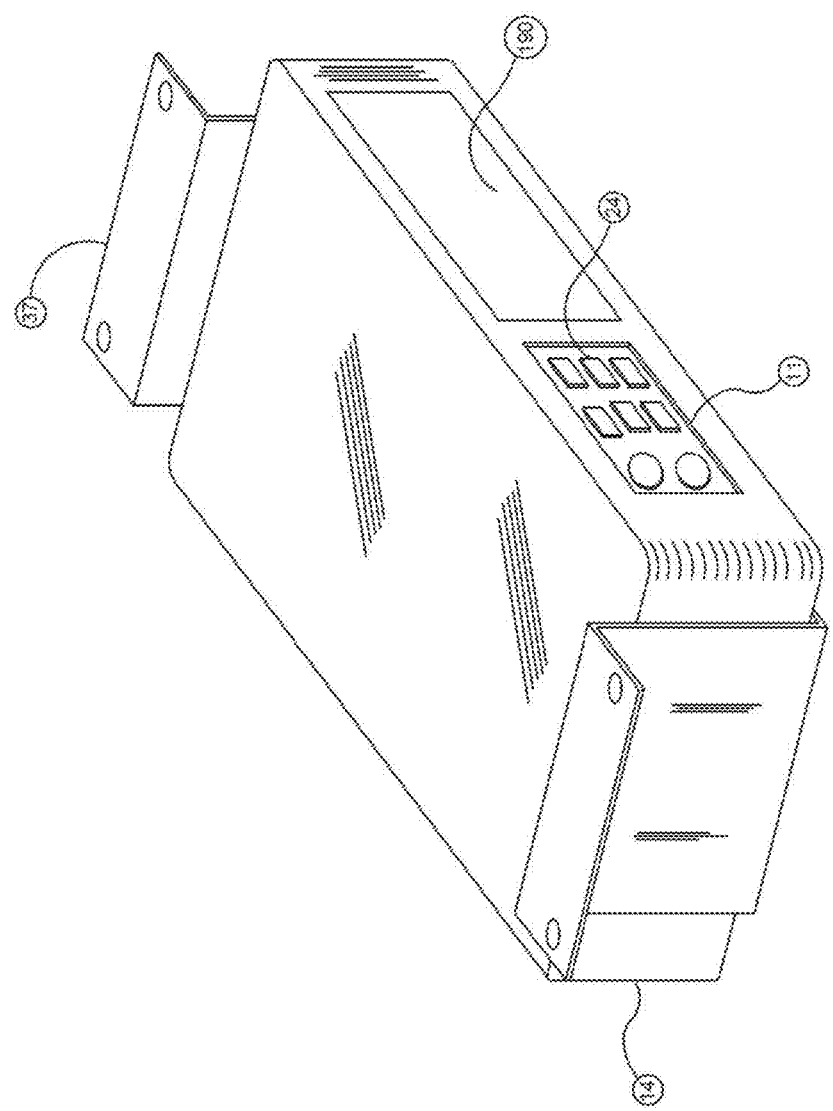
FIG. 9 illustrates a perspective view of the portable heating and cooling device of FIG. 1, in accordance with one or more example embodiments of the present disclosure.

FIG. 9 illustrates a perspective view of a portable heating and cooling device 900 of FIG. 1, in accordance with one or more example embodiments of the present disclosure.

Referring to FIG. 9, the portable heating and cooling device 900 may have at least some of the components and functionality of the portable heating and cooling device 17 described herein, but instead of the lid 14, the portable heating and cooling device 900 may include a door 190 that may open to allow the food or beverage to be placed inside of the portable heating and cooling device 900. The portable heating and cooling device 900 may be operatively connected to one or more connection mechanisms 37, such as brackets that may allow the portable heating and cooling device 900 to be mounted or otherwise attached to another device, such as a surface within a vehicle.

Figure 10:
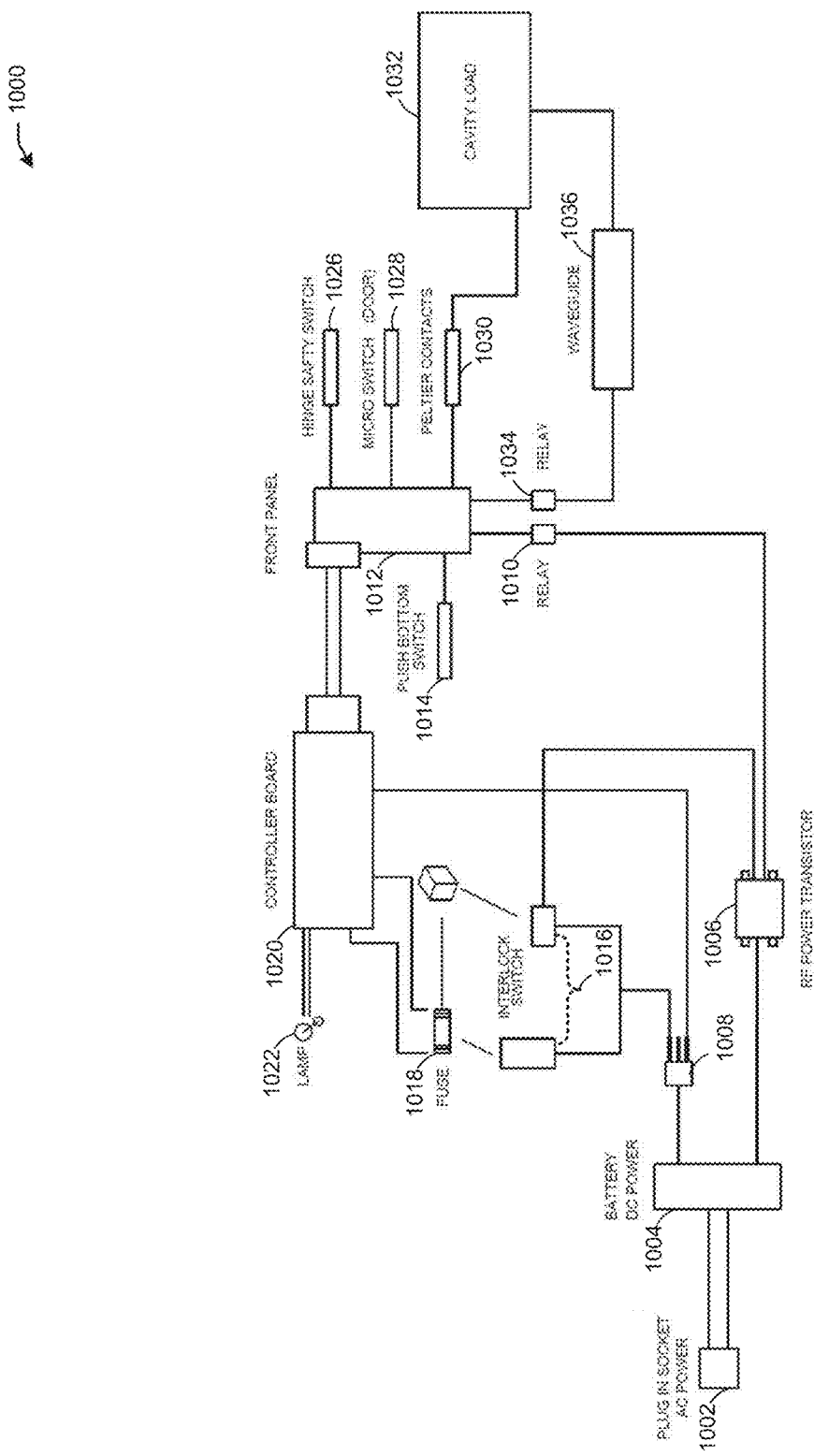
FIG. 10 illustrates a schematic diagram of the portable heating and cooling device of FIG. 1, in accordance with one or more example embodiments of the present disclosure.

FIG. 10 illustrates a schematic diagram 1000 of the portable heating and cooling device 17 of FIG. 1, in accordance with one or more example embodiments of the present disclosure.

Referring to FIG. 10, the schematic diagram 1000 may include a power source 1002, such as a plug-in socket for alternating current (AC) power, which may provide power to a battery 1004 with direct current (DC) power (e.g., the power source 20 as described above). The battery 1004 may provide power to a radio frequency (RF) power transistor 1006 (e.g., the one or more RF transistors 25 as described above). A relay 1010 may operatively connect the RF power transistor 1006 to a front panel 1012, which may be operatively connected to a switch 1014 (e.g., a push-bottom switch or another type of switch). The battery 1004 may provide power to an AC triode 1008 and to an interlock switch 1016 (e.g., for the lid 19 as a microwave door). The interlock switch 1016 may operatively connect to a fuse 1018 and to a controller board 1020 (e.g., as described further below in FIG. 11). The controller board 1020 may control the on and off of a lamp 1022 (e.g., the controller board 1020 may cause the lamp 1022 to turn on when the lid 19 of the portable heating and cooling device 17 is open, and to turn off with the lid 19 of the portable heating and cooling device 17 is closed).

Still referring to FIG. 10, the schematic diagram 1000 may include the controller board 1020 being operatively connected to and controlling the front panel 1012. The front panel 1012 may operatively connect to one or more switches (e.g., a high safety switch 1026 for the hinge 26, a micro switch 1028 for the lid 19). The front panel 1012 may operatively connect to one or more Peltier contacts 1030 (e.g., the one or more contacts 15 as described above). The controller board 1020 may control operation (e.g., activation and deactivation) of the RF power transistor 1006 and the Peltier contacts 1030 through the front panel 1012. When the Peltier contacts are active (e.g., receiving power from the battery 1004), the RF power transistor 1006 may be inactive (e.g., not receiving power from the battery 1004), and the cavity load 1032 (e.g., the load of the inner cavity 18 as described above) may be cooler than when the RF power transistor 1006 is active. When the RF power transistor 1006 is active, the Peltier contacts 1030 may be inactive, and heat from the power of the RF power transistor 1006 may be delivered to the cavity load 1032 via a relay 1034 and a waveguide 1036 (e.g., the waveguide 16 as described above). Other electrical components may be used than the ones shown in FIG. 10.

Figure 11:
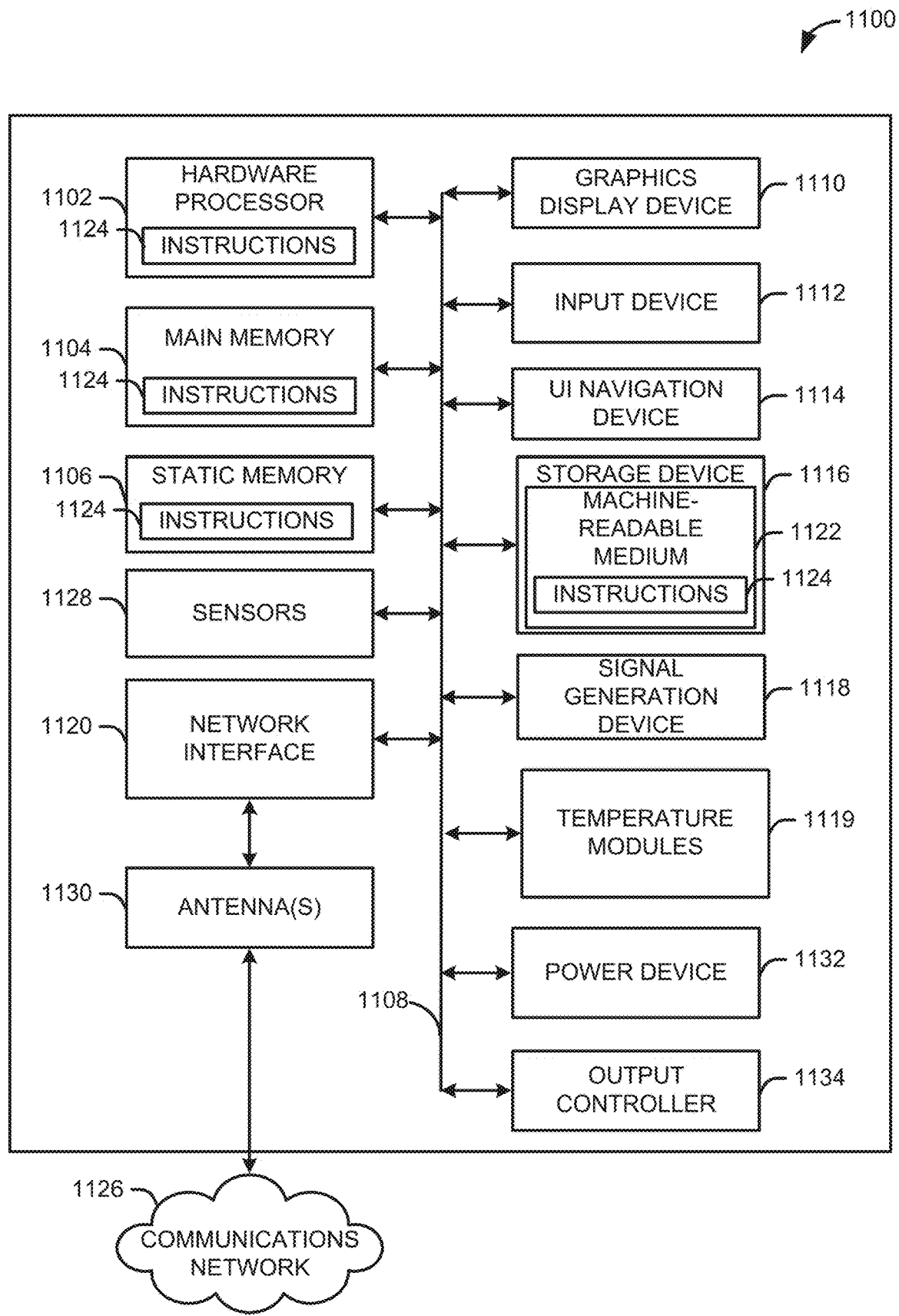
FIG. 11 illustrates a block diagram of an example machine upon which any of one or more techniques (e.g., methods) may be performed, in accordance with one or more example embodiments of the present disclosure.

FIG. 11 illustrates a block diagram of an example machine 1100 upon which any of one or more techniques (e.g., methods) may be performed, in accordance with one or more example embodiments of the present disclosure. For example, the machine 1100 may represent the portable heating and cooling device 17 and its components.

In other embodiments, the machine 1100 may operate as a standalone device or may be connected (e.g., networked) to other machines.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The machine 1100 may further include a power management device 1132, a graphics display device 1110, an alphanumeric input device 1112 (e.g., a keyboard), and a user interface (UI) navigation device 1114 (e.g., a mouse). In an example, the graphics display device 1110, alphanumeric input device 1112, and UI navigation device 1114 may be a touch screen display. The machine 1100 may additionally include a storage device (i.e., drive unit) 1116, a signal generation device 1118 (e.g., a speaker), temperature modules 1119, a network interface device/transceiver 1120 coupled to antenna(s) 1130, and one or more sensors 1128 (e.g., the microwave and temperature sensors described above). The machine 1100 may include an output controller 1134, such as a serial (e.g., universal serial bus (USB), parallel, or other wired or wireless (e.g., infrared (IR), near field communication (NFC), etc.) connection to communicate with or control one or more peripheral devices.

The storage device 1116 may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within the static memory 1106, or within the hardware processor 1102 during execution thereof by the machine 1100. In an example, one or any combination of the hardware processor 1102, the main memory 1104, the static memory 1106, or the storage device 1116 may constitute machine-readable media.

The temperature modules 1119 may receive temperature detected by the sensors 1128, and determine whether to heat or cool the portable heating and cooling device 17 based on the contents of the portable heating and cooling device 17 (e.g., the type of food or beverage) and/or based on user inputs (e.g., received from the input device 1112, such as inputs to heat or cool to a certain temperature for an amount of time, and the like). When the inputs indicate that the temperature should be higher than a detected current temperature within the portable heating and cooling device 17, the temperature modules 1119 may cause activation of the one or more RF transistors 25 (e.g., by connecting the one or more RF transistors to the power source 29 via the one or more switches 302). When the inputs indicate that the temperature should be lower than a detected current temperature within the portable heating and cooling device 17, the temperature modules 1119 may cause activation of the one or more contacts 15 (e.g., by connecting the one or more contacts 15 to the power source 29 via the one or more switches 304). The temperature modules 1119 may deactivate (e.g., open the switches of) the one or more RF transistors 25 when the one or more contacts 15 are active, and vice versa. In this manner, the temperature modules 1119 may cause heating or cooling of the portable heating and cooling device 17 at any given time.

While the machine-readable medium 1122 is illustrated as a single medium, the term "machine-readable medium" may include a single medium or multiple media (e.g., a centralized or distributed database, and/or associated caches and servers) configured to store the one or more instructions 1124.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1100 and that cause the machine 1100 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1124 may further be transmitted or received over a communications network 1126 using a transmission medium via the network interface device/transceiver 1120 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1120 may include one or more physical jacks (e.g., Ethernet, coaxial, or phone jacks) or one or more antennas to connect to the communications network 1126.

The word "exemplary" is used herein to mean "serving as an example, instance, or illustration." Any embodiment described herein as "exemplary" is not necessarily to be construed as preferred or advantageous over other embodiments.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Figure 12:
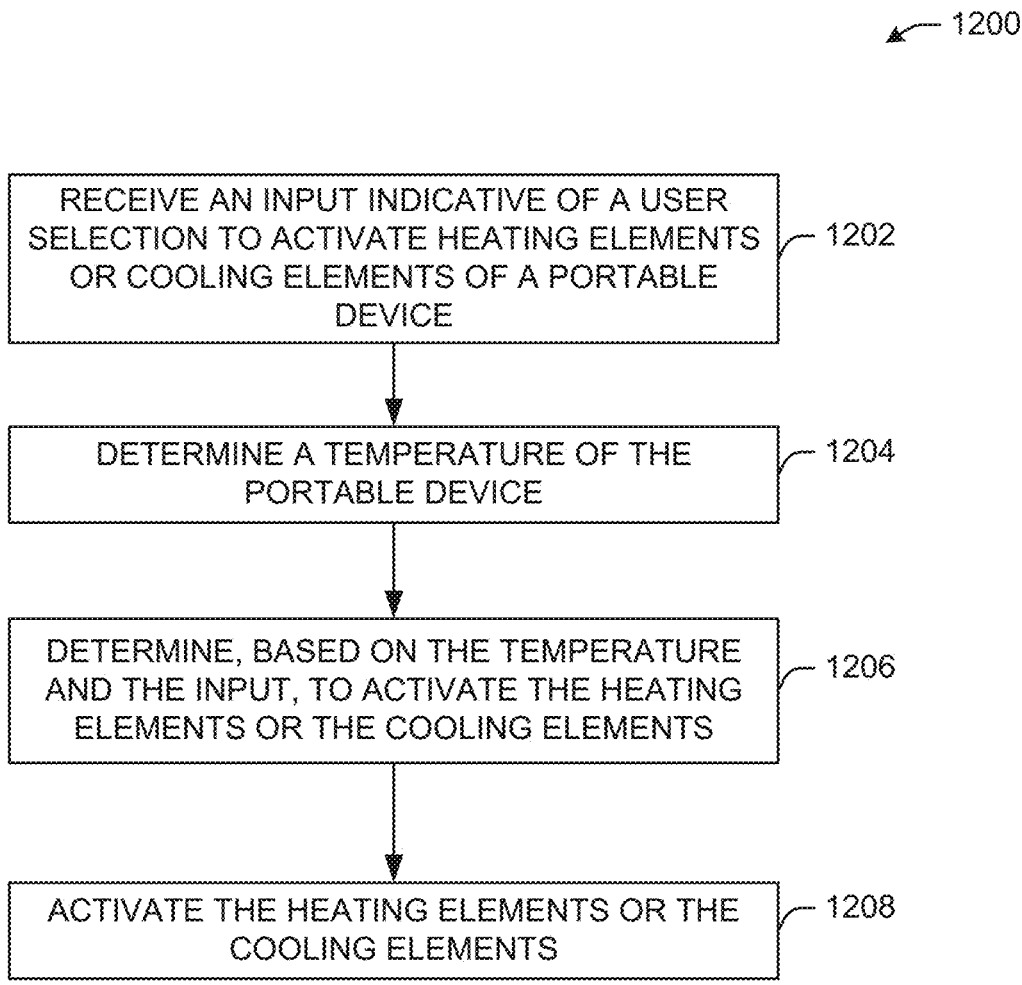
FIG. 12 illustrates a flow diagram for a process for using the portable heating and cooling device of FIG. 1, in accordance with one or more example embodiments of the present disclosure.

FIG. 12 illustrates a flow diagram for a process 1200 for using the portable heating and cooling device 17 of FIG. 1, in accordance with one or more example embodiments of the present disclosure.

At block 1202, a device (e.g., the portable heating and cooling device 17) may receive an input indicative of a user selection to activate heating or cooling elements of the device. For example, the device may receive user inputs (e.g., using the input device 1112) that indicate a request to heat or cool the interior of the device, that indicate a desired temperature, that indicate the contents (e.g., type of food or beverage) of the device, and the like.

At block 1204, the device may determine temperature, such as the interior temperature of the device (e.g., using the one or more sensors 250). At block 1206, the device may determine, based on the temperature and the input, whether to activate the heating elements (e.g., provide power to the one or more RF transistors 25) or the cooling elements (e.g., provide power to the one or more contacts 15). The device may determine that the desired temperature based on the input is greater than or lower than a current temperature within the device, and may determine whether the heating or cooling elements are to be active to cause the temperature within the device to reach a temperature requested by or associated with the input.

At block 1208, the device may activate (e.g., cause activation of) the heating or cooling elements by closing one or more respective switches for the heating elements or the cooling elements. When the device determines that the temperature within the device is to be decreased, the device may close the switches to the cooling elements (and open the switches to the heating elements) to provide power to the cooling elements, which by contact with or close proximity to the interior surface of the device, may cause the inside of the device to drop in temperature. When the device determines that the temperature within the device is to be increased, the device may close the switches to the heating elements (and open the switches to the cooling elements) to provide power to the heating elements, which may deliver heat (e.g., via the waveguide 16) to the interior of the device.

In one or more embodiments, the device may heat after cooling, and/or may cool after heating. In this manner, the device may provide heating or cooling on demand. For example, a user of the device may desire to keep food and beverage cool during the day (e.g., the device may function as a cooler) until mealtime. The user may then provide one or more inputs indicating a request to heat the food or beverage, and the device may activate the heating elements (e.g., functioning as a microwave). The user may request that the device cool again to preserve any leftover food or beverage. In this manner, the device may function as a microwave and a cooler within the same space (e.g., the food or beverage placed within the inner cavity 18 may be heated or cooled) rather than a user having to transfer the contents of the device to another device for heating or cooling.

In one or more embodiments, the steps (e.g., blocks) of FIG. 12 may be facilitated by the temperature modules 1119, which may include or be operatively connected to the hardware processor 1102, and may control the operations of the device using the hardware processor 1102. The temperature modules 1119 in combination with the hardware processor 1102 may control the operation of switches (e.g., the one or more switches 302 and the one or more switches 304 of FIG. 3). The functionality of the machine 1100 may be performed by the control pad 24. For example, the control pad 24 may include at least some of the components of the machine 1100, such as the temperature modules 1119 and the hardware processor 1102, which may be operatively connected to the one or more switches 302 and the one or more switches 304 in wired and/or wireless communications. For example, wired communications may use wiring (not shown) between the inner casing 12 and the housing 14, or within the inner casing 12 and/or the housing 14.

In one or more embodiments, the activation of heating and cooling elements (e.g., the opening and closing of the one or more switches 302 and the one or more switches 304) may be caused by a manual selection (e.g., a flipping of a switch or pushing of a button). The manual selection may be made using the interface display panel 24 or the control pad 11. For example, the interface display panel 24 or the control pad 11 may allow for the selection of heating or cooling via a manual flipping of a switch that causes either the one or more switches 302 or the one or more switches 304 to be closed at a given time for heating or for cooling.

In one or more embodiments, the power source 20 may include multiple power sources (e.g., a power source operatively connected to the one or more switches 302 to activate the one or more RF transistors 25 by providing current to the one or more RF transistors 25, and a power source operatively connected to the one or more switches 304 to activate the one or more contacts 15 by providing current to the one or more contacts 15). In this manner, activating the heating or cooling elements may depend on the source of power being provided by the power source for the heating elements or by the power source for the cooling elements.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

The processes described and shown above may be carried out or performed in any suitable order as desired in various implementations. Additionally, in certain implementations, at least a portion of the processes may be carried out in parallel, creating a co-existence use case. Furthermore, in certain implementations, less than or more than the processes described may be performed.

Certain aspects of the disclosure are described above with reference to flow diagrams of methods, apparatuses, or computer program products according to various implementations. It will be understood that one or more blocks of the flow diagrams, and combinations of blocks in the flow diagrams, can be implemented by computer-executable program instructions. Likewise, some blocks of the flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the flow diagrams support combinations of means for performing the specified functions, combinations of elements or steps for performing the specified functions and program instruction means for performing the specified functions. It will also be understood that each block of the flow diagrams, and combinations of blocks in the flow diagrams, can be implemented by special-purpose, hardware-based computer systems that perform the specified functions, elements or steps, or combinations of special-purpose hardware and computer instructions.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims.

The invention claimed is:

1. A portable device, comprising:
an exterior surface;
an interior surface;
one or more heating elements positioned at least partially between the exterior surface and the interior surface;
one or more cooling elements positioned at least partially between the exterior surface and the interior surface, wherein the one or more heating elements are different than the one or more cooling elements; and
one or more power sources operatively connected to the one or more heating elements and the one or more cooling elements,
wherein the one or more heating elements are configured to receive power from the one or more power sources while the one or more cooling elements are inactive, and wherein the one or more cooling elements are configured to receive power from the one or more power sources while the one or more heating elements are inactive.

2. The portable device of claim 1, wherein the one or more power sources is operatively connected to the one or more heating elements and the one or more cooling elements using a power line.

3. The portable device of claim 1, wherein the one or more power sources is operatively connected to the one or more heating elements using a first power line, and wherein the one or more power sources is operatively connected to the one or more cooling elements using a second power line.

4. The portable device of claim 1, wherein the one or more power sources is operatively connected to the one or more heating elements and the one or more cooling elements using first switches and second switches, wherein the first switches are closed and the second switches are open when the one or more heating elements are active, and wherein the second switches are closed the first switches are open when the one or more cooling elements are active.

5. The portable device of claim 1, further comprising at least one processor that controls, based on the one or more power sources, activation of one of the one or more heating elements or the one or more cooling elements at a time, wherein the at least one processor is configured to:
receive an input indicative of a user selection to activate one of the one or more heating elements or the one or more cooling elements; and
cause the one or more power sources to provide power to the one of the one or more heating elements or the one or more cooling elements based on the input.

6. The portable device of claim 1, wherein the one or more heating elements comprise a transistor, and wherein the one or more cooling elements comprise a Peltier contact.

7. The portable device of claim 1, wherein the one or more heating elements comprise a first Peltier contact, and wherein the one or more cooling elements comprise a second Peltier contact.

8. The portable device of claim 1, wherein the one or more heating elements comprise four heating elements.

9. The portable device of claim 1, wherein the one or more heating elements are operatively connected to a feeding port positioned at least partially within a cavity defined by the interior surface.

10. The portable device of claim 1, further comprising a sensor and at least one processor, wherein the at least one processor is configured to:
receive sensor data from the sensor;
determine, based on the sensor data, a temperature; and
cause the one or more power sources to provide power to the one of the one or more heating elements or the one or more cooling elements based on the temperature.

11. A system, comprising:
an exterior surface;
an interior surface defining a cavity;
a removable casing positioned within the cavity;
a temperature sensor;
one or more heating elements positioned at least partially between the exterior surface and the interior surface;
one or more cooling elements positioned at least partially between the exterior surface and the interior surface, wherein the one or more heating elements are different than the one or more cooling elements;
one or more power sources operatively connected to the one or more heating elements and the one or more cooling elements; and
at least one processor that controls the one or more power sources, wherein one of the one or more heating elements or the one or more cooling elements is active at a time,
wherein the one or more heating elements are configured to receive power from the one or more power sources while the one or more cooling elements are inactive, and wherein the one or more cooling elements are configured to receive power from the one or more power sources while the one or more heating elements are inactive.

12. The system of claim 11, wherein the one or more power sources is operatively connected to the one or more heating elements and the one or more cooling elements using a power line.

13. The system of claim 11, wherein the one or more power sources is operatively connected to the one or more heating elements using a first power line, and wherein the one or more power sources is operatively connected to the one or more cooling elements using a second power line.

14. The system of claim 11, wherein the one or more power sources is operatively connected to the one or more heating elements and the one or more cooling elements using first switches and second switches, wherein the first switches are closed and the second switches are open when the one or more heating elements are active, and wherein the second switches are closed the first switches are open when the one or more cooling elements are active.

15. The system of claim 11, wherein the at least one processor is configured to:

receive an input indicative of a user selection to activate one of the one or more heating elements or the one or more cooling elements; and cause the one or more power sources to provide power to the one of the one or more heating elements or the one or more cooling elements based on the input.

16. The system of claim 11, wherein the one or more heating elements comprise a transistor, and wherein the one or more cooling elements comprise a Peltier contact.

17. The system of claim 11, wherein the one or more heating elements comprise a first Peltier contact, and wherein the one or more cooling elements comprise a second Peltier contact.

18. The system of claim 11, wherein the one or more heating elements comprise four heating elements.

19. The system of claim 11, wherein the one or more heating elements are operatively connected to a feeding port positioned at least partially within a cavity defined by the interior surface.

20. A method, comprising:

receiving, by at least one processor associated with a portable device, an input indicative of a user selection to activate one of one or more heating elements associated with the portable device or one or more cooling elements of the portable device, wherein the one or more heating elements are different than the one or more cooling elements;

determining, by the at least one processor, a temperature associated with the portable device;

determining, by the at least one processor and based on the temperature and the input, that the one of the one or more heating elements or the one or more cooling elements is to be activated; and causing activation, by the at least one processor and based on the input, of the one of the one or more heating elements or the one or more cooling elements at a time by providing power from one or more power sources to the one or more cooling elements while the one or more heating elements are inactive and by providing power from the one or more power sources to the one or more heating elements while the one or more cooling elements are inactive.

* * * * *